United States Patent [19]

Kenworthy

[11] 3,750,856

[45] Aug. 7, 1973

[54] ADJUSTABLE, PRESSURE COMPENSATING SHOCK ABSORBER/BUFFER

[76] Inventor: Grant F. Kenworthy, 1688 Chestnut, Des Plaines, Ill. 60018

[22] Filed: Dec. 9, 1971

[21] Appl. No.: 206,429

[52] U.S. Cl. ............................................. 188/287
[51] Int. Cl. .............................................. F16f 9/50
[58] Field of Search .................... 188/280, 281, 287

[56] References Cited
UNITED STATES PATENTS

| | | | |
|---|---|---|---|
| 3,605,960 | 9/1971 | Singer | 188/287 |
| 3,510,117 | 5/1970 | Scholin et al. | 188/287 X |
| 3,344,894 | 10/1967 | Kenworthy | 188/287 |
| 3,478,846 | 11/1969 | Germond | 188/287 X |

*Primary Examiner*—M. Henson Wood, Jr.
*Assistant Examiner*—Michael Mar
*Attorney*—Carlton Hill et al.

[57] ABSTRACT

A rectilinear piston and cylinder shock absorber has an inner cylinder sleeve responsive to overload against the piston and/or excessive piston velocity to throttle hydraulic fluid displacement from the piston chamber through a metering system including a cooperating fixed cylinder member. The kinetic energy range of the shock absorber may be readily adjusted.

7 Claims, 7 Drawing Figures

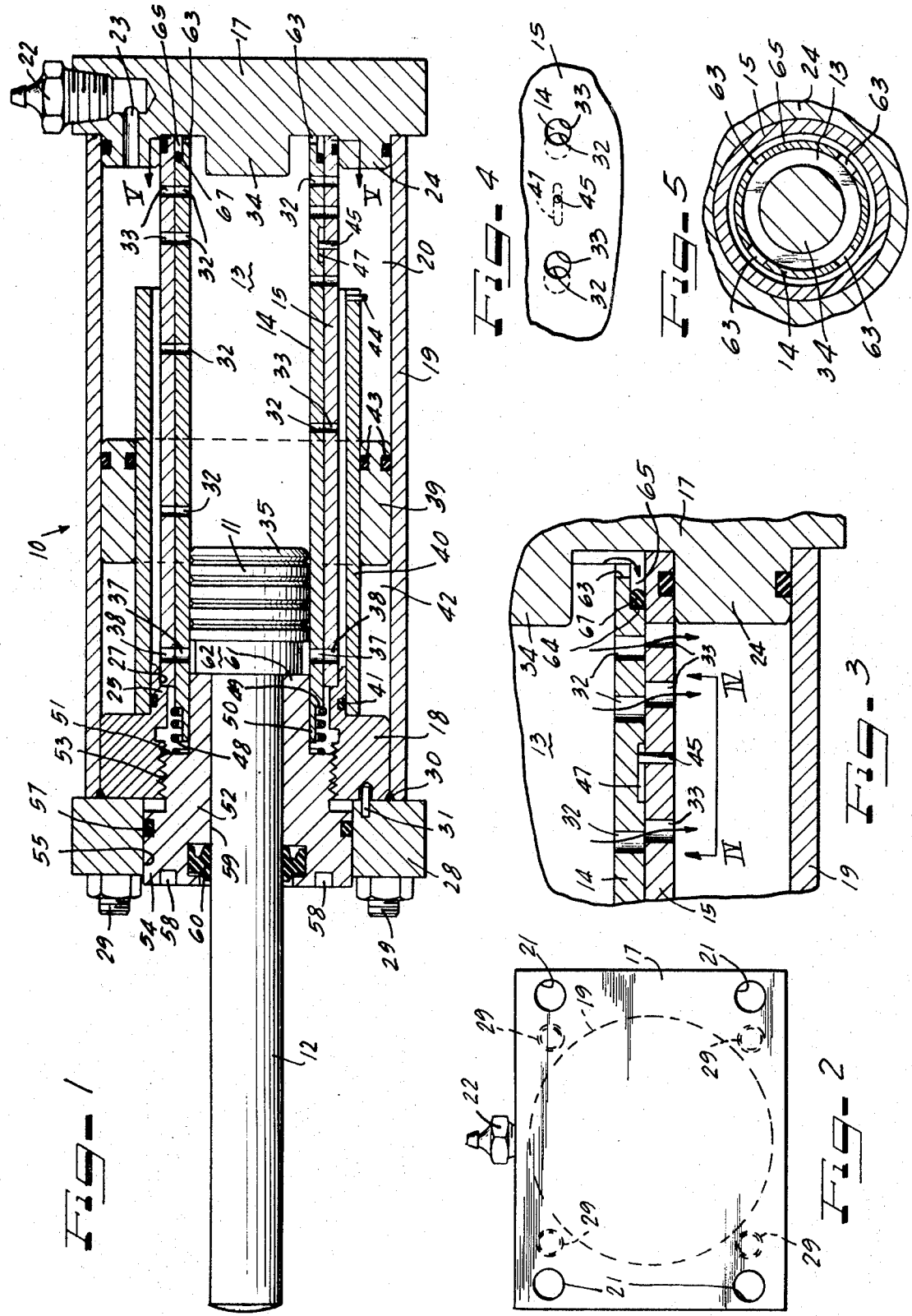

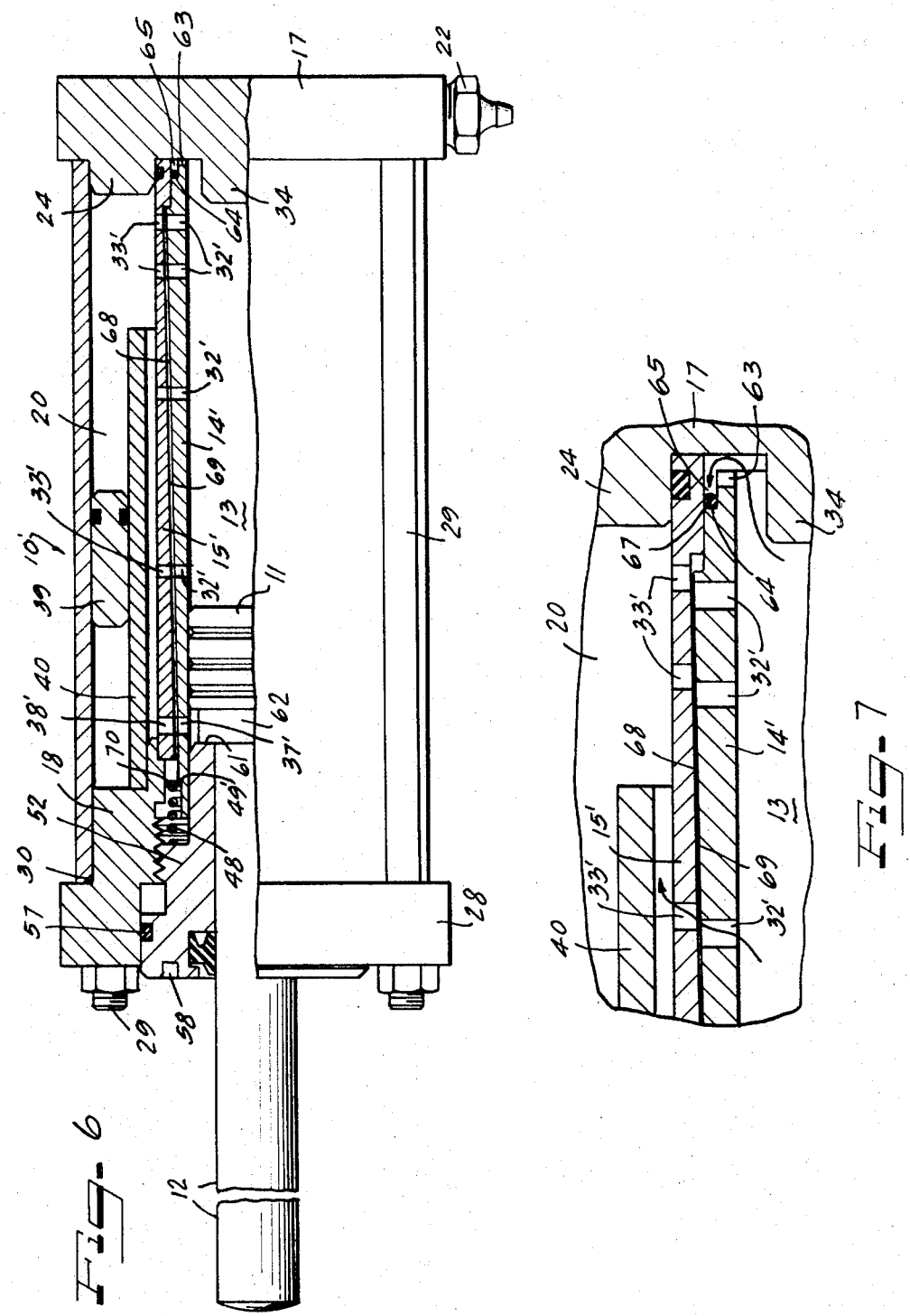

ADJUSTABLE, PRESSURE COMPENSATING SHOCK ABSORBER/BUFFER

This invention relates generally to direct acting or linear shock absorbers or buffers, and is more particularly concerned with devices of this kind in which kinetic energy is absorbed during a telescoping stroke of a piston within a cylinder by displacement of hydraulic fluid through an orifice system.

Numerous and varied dash pot or rectilinear piston and cylinder shock absorbers and snubbers involving displacement of hydraulic fluid by a piston operating in a cylinder have been proposed heretofore. In order to compensate for variable loads and velocities often complex and sometimes not always reliable valve mechanisms have been proposed, involving complexities and uneconomical mechanisms as well as lacking ruggedness and durability.

It is accordingly an important object of the present invention to overcome the foregoing and other disadvantages, defects, inefficiencies, shortcomings and problems in prior structures and to attain important advantages and improvements in a new and improved pressure compensating shock absorber construction of the rectilinear type.

Another object of the invention is to provide a new and improved rectilinear shock absorber having novel variable piston loads and/or velocity compensating means.

A further object of the invention is to provide a new and improved rectilinear shock absorber operable at a uniform deceleration rate in spite of variable loads or velocity tendencies.

Still another object of the invention is to provide a new and improved simple, rugged, efficient, durable, pressure compensating shock absorber construction.

Yet another object of the invention is to provide a new and improved adjustable, pressure compensating shock absorber construction.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a longitudinal sectional elevational view through a shock absorber embodying features of the invention;

FIG. 2 is an end elevational view looking toward the left in FIG. 1;

FIG. 3 is an enlarged fragmentary sectional detail view taken in the same plane as FIG. 1;

FIG. 4 is a fragmentary elevational view taken substantially in the plane of line IV—IV of FIG. 3;

FIG. 5 is a fragmentary sectional detail view taken substantially along the line V—V of FIG. 1;

FIG. 6 is a sectional elevational view through a modified construction of the shock absorber; and FIG. 7 is an enlarged fragmentary sectional detail view taken in the same plane as FIG. 6.

On reference to FIGS. 1–5, a representative buffer or shock absorber 10 embodying features of the invention includes a piston 11 having a piston rod 12 and relatively reciprocably operable in a cylindrical working chamber 13 defined by a cylinder sleeve 14 slidably coaxially telescopically engaged within a cylinder tube 15 fixedly engaged at its ends by and between a base end closure 17 and a head end closure 18 which also mount a tubular reservoir housing casing 19 of larger diameter than the cylinder member 15 and therewith define a replenishing reservoir 20. In the form shown, the base closure 17 provides means for attaching the unit to a support, being provided with bolt holes 21 for this purpose (FIG. 2). In addition, the end closure member 17 may be provided with means for filling hydraulic fluid into the unit, herein comprising a conventional check valved nipple 22 communicating by way of a passage 23 with the reservoir 20. Spaced concentricity of the tubular elements 15 and 19 is provided by an annular axially inwardly extending flange 24 on the closure member 17 with which the adjacent end portions of the tubular members are telescopically engaged, with suitable sealing means to prevent leakage between the joints. At the head end of the shock absorber housing, the head closure member 18 is telescopically engaged within the head end portion of the reservoir tube 19 and has an axially inwardly extending centering flange 25 provided with a rabbet groove seat 27 in which is engaged the adjacent end of the cylinder member 15. Thrusting the member 18 axially toward the cylinder member 15 and the reservoir tube 19 toward the end member 17 is a head flange member 28 connected to the base member 17 as by means of tie rods or bolts 29. Leakage through the joint between the members 18, 19 and 28 is prevented by suitable seal 30. Relative orientation of the head members 18 and 28 is maintained by means such as one or more staking pins 31 extending in and between the two members.

An important feature of the shock absorber 10 is its capability of decelerating during the compression stroke and automatically compensating for load variables within the kinetic energy range for which the unit may have been designed. To this end, the cylinder comprising the members 14 and 15 is provided with means for metering hydraulic fluid such as oil between the working chamber 13 and the reservoir 20. In a preferred form, the metering means comprise a set of suitably dimensioned and distributed metering orifices 32 extending radially through the wall of the member 14 normally aligned concentrically with like metering orifices 33 extending radially through the wall provided by the member 15. As shown the orifices 32 are located inwardly relative to the piston 11 in its fully retracted position, that is, in its ready position. Thus, as the piston 11 moves inwardly in a compression stroke hydraulic fluid is initially expelled by piston pressure from all of the orifices 32, 33 to afford, in normal operation, initial minimum resistance to hydraulic fluid displacement from the cylinder working chamber 13 to the reservoir. As the piston 11 continues in a compression stroke, the metering orifices are progressively closed so that resistance to compression stroke movement of the piston develops progressively for deceleration to the end of the stroke wherein the piston may come to rest against an inwardly projecting stop boss 34 projecting from the base closure 17 concentrically into the cylinder chamber 13 in substantial spaced clearance relation to the inner end portion of the cylinder sleeve 14. At its inner end, the stop boss 34 is generally in alignment with the innermost of the orifices 32 in such relation that when the piston 11 is in full stopping engagement with the boss, such innermost orifice will remain open to the cylinder chamber for return displacement or replenishment flow of hydraulic fluid from the reservoir 20 into the cylinder chamber to initiate return stroke of the piston 11. In the present instance clearance to avoid obstruction of the innermost orifice 32 is implemented by an annular chamfer 35 on the innermost corner of the piston.

Free transfer of hydraulic fluid between the low pressure reservoir 20 and the outer end of the piston 11 is assured by the provision of a plurality of registering displacement ports 37 and 38 in the outer end portions of the cylinder sleeve 14 and the member 15, respectively. Thus, both during compression stroke and return stroke hydraulic fluid may displace freely between the cylinder chamber and the reservoir on the outer or piston rod end of the piston.

To provide for automatic return of the piston 11 after a compression stroke, means are provided for normally maintaining the hydraulic fluid in the reservoir 20 under sufficient pressure for this purpose but avoiding undersirable back pressure during the compression stroke of the piston. In a desirable arrangement such means comprise an annular free floating piston 39 which as its outer perimeter slidably engages the inner surface of the reservoir tube 19 and on its inner perimeter engages a spacer tube 40 which has its outer end portion telescopically engaged about the retainer flange 25 with a seal 41 sealing the joint. Thereby a return spring air space chamber 42 is provided between the return pressure piston 39 and the inner end of the retainer member 18. At its inner end the tube 40 extends substantially short of the base closure 17 so that there is free access of hydraulic fluid to the inner end of the pressure piston 39, the fill of such fluid being sufficient to maintain the air in the chamber 42 under constant return bias compression, but nevertheless leaving sufficient length of the air chamber 42 to accommodate piston rod displacement into the cylinder chamber 13. Suitable annular seals 43 carried in the perimeter of the annular piston 39 prevent leakage of hydraulic fluid into the air chamber. Escape of the piston 39 from the tube 40 is prevented by means such as a stop pin 44 projecting into the path of the annular piston from the inner end portion of the tube 40. On its inner diameter the tube 40 is sufficiently larger than the cylinder tube 15 to provide ample free flow clearance at the reservoir ends of the orifices 33 and the ports 38.

A unique feature of the present invention resides in the means whereby the shock absorber 10 is automatically self-adjusting for uniform deceleration under varying loads due to weight and/or velocity within the kinetic energy range for which the unit has been designed To this end, means are provided for throttling flow through the orifice passages 32, 33 substantially proportionate to and in response to pressure greater than a predetermined or set value in the cylinder chamber 13. Such 4). is enabled by the ability of the cylinder sleeve 14 to shift relative to the fixed cylinder sleeve 15 to correspondingly relatively displace the orifices 32 and 33 from their normal passage alignment so that the passages are reduced in cross sectional flow area proportionate to the shift or displacement. Desirably pressure-responsive shifting of the cylinder sleeve 14 is in an axial direction as permitted by keying means comprising a keying pin 45 projecting from the fixed cylinder member 15 into a longitudinally elongated key slot 47 in the interface surface of the cylinder sleeve 14 (FIGS. 1 and 4).

Normally the cylinder sleeve 14 is maintained in position relative to the fixed cylinder member 15 for straight through full flow passage relationship through the aligned orifices 32 and 33. For this purpose yieldable biasing means are provided at the outer end of the cylinder sleeve 14, conveniently comprising a coiled compression spring 48 which is engaged at its inner end against a shoulder 49 facing axially outwardly on the sleeve 14 at the base of an axially outwardly projecting stop flange 50 on the sleeve extending within the spring toward and in normally spaced relation to an axially inwardly facing shoulder 51 on member 52 against which the outer end of the spring engages under suitable compression loading toward the sleeve shoulder 49. Conveniently the member 52 provides means for adjusting the compression or loading of the spring 48 and to this end conveniently comprises an axially adjustable stepped plug having an intermediate portion 53 thereof externally threaded to engage in internal threads on the closure member 18 which for this purpose is ring-shaped. At its outer end the plug 52 has a head portion 54 which is peripherally slidably engaged within an axial bore 55 provided in the thrust member 28, with a sealing ring 57 providing a seal for the joint. To enable threaded adjustment of the member 52 it may be provided with suitable wrench sockets 58 opening outwardly in its outer end face. In addition, the member 52 serves as a concentricity guide for the piston 11 and the cylinder sleeve 14, being provided for this purpose with a bore 59 through which the piston rod 12 projects outwardly past a suitable packing 60, while the inner end of the member 52 has an inward reduced diameter concentricity projection 61 which is slidably telescopically engaged concentrically within the inner end portion of the sleeve 14 and serves as a stop for a reduced diameter outer end shoulder extension 62 on the piston providing a positive spacer aligned with the ports 37 in the at rest, fully extended starting position of the piston. By manipulating the member 52 to threadedly drive it axially inwardly or outwardly relative to the adjacent end of the cyliuder sleeve 14, the compressive force exerted by the spring 48 can be adjusted to suit the operating conditions for which the unit 10 is intended, and more particularly to maintain the cylinder sleeve 14 in the normal position for full passage registration of the orifices 32 and 33 to enable uniform deceleration up to a predetermined or preferred pressure resistance in the high pressure working chamber 13.

Means are provided for shifting the cylinder sleeve 14 axially outwardly relative to the cylinder tube 15 to effect throttling of the orifice passages substantially proportionate to development of pressure in the high pressure working chamber 13 in excess of that for which the spring 48 has been set, whereby to compensate for relative compression thrusts of the piston 11 such as may be occasioned by working load or velocity thrusts. For this purpose, one or more bypass slots or notches 63, in this instance four (FIGS. 1, 3 and 5) are provided in the inner end of the sleeve 14 to effect communication between the chamber 13 and an annular pressure shoulder 64 at the root of an annular rabbet groove 65 opening from the outer perimeter and inner end of the sleeve. To gain maximum value of hydraulic pressure fluid thrusting toward the shoulder 64, an O-ring seal 67 is desirably mounted in the groove 65 to prevent loss of pressure through the interface between the members 14 and 15. Through this arrangement, excessive pressure in the chamber 13 is communicated to the shoulder 64 in opposition to bias of the spring 48, causing the sleeve 14 to shift axially outwardly, unseating the inner end of the sleeve from engagement with the end closure 17 and exposing the entire end of the sleeve to the excessive pressure, to the end that the orifices 32 in the sleeve 14 will shift relative to the orifices 33 as shown in FIGS. 3 and 4, whereby to diminish the flow area and throttle each of the orifice passages and increase the resistance to movement of the piston 11 proportionate to the excessive load or velocity thrust to which the piston is subjected, and thereby automatically continue uniform deceleration of the piston in its compression stroke. It will be appreciated that this arrangement assures advantageous pressure compensating sensitivity of the cylinder sleeve 14 during the compression strokes of the piston 11 for assuring uniform deceleration in the operations of the shock absorber 10.

In the modification of FIGS. 6 and 7, the shock absorber or buffer unit 10' is shown as in all respects identical with the unit 10 of FIG. 1 except that an alternate means for attaining orifice control by and between the cylinder sleeve 14' and the fixed cylinder tube 15' is depicted. In this instance the inner end portions of the telescopically interengaged members 14 and 15 are in cylindrical slidably engaged relation, but from the innermost of the orifices 32' and 33', interface surfaces 68 and 69 of the sleeve 14' and the tube 15', respectively, taper frusto-conically in narrowly spaced realtion to the outer ends of the members. Thereby in the normal relationship of the members 14 and 15, a narrow communication gap between the members provides for hydraulic fluid displacement communication between the orifices 32' and 33', eliminating any need for keying the members against relative rotation. Due to diminution in width of the shoulder 49' at the outer end portion of the sleeve 14', a seating ring 70 may be mounted thereon for thrusting thereagainst of the inner end of the biasing spring 48. Upon pressure responsive axially outward shifting of the cylinder sleeve 14', the communicatiOn gap between the surfaces 68 and 69 is progressively diminished in proportion to the pressure and thus throttles communication between the orifices 32' and 33' to the same effect and for the same purpose as in the unit 10 of FIG. 1 where the orifices while remaining in general flow passage radial alignment are relatively shifted to effect throttling through the passage provided thereby.

In both forms of the invention disclosed, adjustment of the head member 52 relative to the end of the stop flange 50 of the cylinder sleeve 14 is adapted to prevent pressure lock where the device is used under conditions requiring handling of high velocity, low mass loads. For this purpose, the member 52 can be adjustably threaded in toward the end of the stop flange 50 to a spacing which will prevent closing of the orifice passages at least during the initial portion of the compression stroke of the piston.

It will be evident that the shock absorber, buffer unit of the present invention will find utility in numerous and varied practical applications and is especially useful where the speed of the load or the load weight during compression stroke of the piston may not be accurately known or may vary from stroke-to-stroke. Typical of uses for the device are in quenching tank supports where the piece weights vary, transfer mechanisms such as automated stacking or unstacking devices, foundry conveyor lines where the flask weights are constantly varying, baggage or mail conveyors, various types of yieldable stops, etc.

It will be understood that variations and modifications may be effected without departing from the spirit and scope of the novel concepts of this invention.

I claim as my invention:

1. A shock absorber/buffer unit comprising:
   means defining a housing enclosing a hydraulic fluid reservoir;
   a cylinder structure comprising relatively shiftable telescopically related tubular members having radial metering orifices at longitudinally spaced intervals normally aligned to provide passages for displacement therethrough of hydraulic fluid between the chamber and reservoir;
   one of said members being located interiorly of the other of said members and the other of said members being fixedly mounted relative to said housing;
   a reciprocable piston in said working chamber within said one of said members and reciprocable therein in compression and return strokes for displacement of hydraulic fluid through said passages between said chamber and reservoir;
   said one member being reciprocable relative to said other member and to said piston; and
   a pressure-responsive shoulder area of that end portion of said one member toward which the piston moves in compression stroke so that pressure generated by the piston in the compression stroke drives said one member to move in the opposite direction relative to the piston to effect throttling of said orifice passages.

2. A unit according to claim 1, including means normally biasing said one member into a position relative to said other member for relatively unthrottled communication between the respective orifices.

3. A unit according to claim 2, including means controlling said members to maintain the respective orifices in alignment.

4. A unit according to claim 2, wherein said members have facing interfaces providing communication gap therebetween for said orifices, and said gap being progressively diminished in the pressure-responsive shifting of said one member relative to said other member.

5. A unit according to claim 2, including means for adjusting the biasing thrust of said biasing means.

6. A unit according to claim 1, including means for limiting the effect of said pressure-responsive means in effecting throttling of said passages.

7. A unit according to claim 1, wherein said means defining a housing comprise a tubular member and opposite end closures engaged therewith including means securing the end closures to the respective opposite ends of the tubular member, said other member having its opposite ends fixedly connected to the respective end closures and defines thereabout a reservoir space with said tubular housing member, the inner of said members comprising a sleeve providing said working chamber, means normally biasing said sleeve member into position relative to the fixedly connected member and wherein said passages are relatively unthrottled, said pressure generated by the piston in the compression stroke causing the sleeve to move in opposition to said biasing means to effect said throttling, and yieldable means normally maintaining a limited pressure on hydraulic fluid in said reservoir for positive replenishment of said working chamber.

* * * * *